United States Patent

[11] 3,580,997

| [72] | Inventors | Thomas Alan Webb<br>Milford;<br>Jay A. Harvey, Fairfield, Conn. |
|---|---|---|
| [21] | Appl. No. | 742,948 |
| [22] | Filed | July 5, 1968 |
| [45] | Patented | May 25, 1971 |
| [73] | Assignee | Balteau Electric Corporation<br>Stamford, Conn. |

[54] VIDEO SYSTEM FOR AUTOMATIC PRODUCTION LINE INSPECTION BY X-RAY
26 Claims, 6 Drawing Figs.

[52] U.S. Cl. ............................................... 178/6.8,
178/7.2, 250/52, 250/83.3, 356/205
[51] Int. Cl. ........................................... H04n 1/38,
H04n 7/18
[50] Field of Search ........................................ 356/204,
205, 206; 178/6 (Inquired), 6.8 (Inquired), 7.2,
7.1; 250/52, 83.3 (D)(Inquired)

[56] References Cited
UNITED STATES PATENTS

| 2,082,093 | 6/1937 | Bedford | 178/7.2 |
|---|---|---|---|
| 2,360,326 | 10/1944 | Adrian | 250/83.3D |
| 2,549,402 | 4/1951 | Vossberg | 250/83.3D |
| 2,557,868 | 6/1951 | Fua | 250/52 |
| 2,653,247 | 9/1953 | Lundahl | 250/83.3D |
| 3,076,054 | 1/1963 | Simon | 178/6 |
| 3,158,683 | 11/1964 | Waggener | 178/7.2 |
| 3,280,253 | 10/1966 | McMaster | 178/6.8 |
| 3,342,933 | 9/1967 | Zieler | 178/7.1 |

Primary Examiner—Robert L. Griffin
Assistant Examiner—Joseph A. Orsino, Jr.
Attorney—Robert A. Buckles ABSTRACT: The disclosed system employs a television camera to convert the radiographic image produced by an irradiated test object to video signals which are processed and interpreted electronically without human interpretation. The video signals are processed to provide an indication of the radiographic density of a test object in relation to that of a reference object. When plural test objects are analyzed in succession and/or are in motion while being irradiated, a radiation mask having synchronizing and coding slots is used to coordinate the video signal processing circuitry to the scan of the TV camera.

Patented May 25, 1971

INVENTORS.
JAY A. HARVEY
THOMAS A. WEBB

BY Robert A. Buckles

ATTORNEY

VIDEO SYSTEM FOR AUTOMATIC PRODUCTION LINE INSPECTION BY X-RAY

BACKGROUND OF THE INVENTION

Radiography has for many years been an essential tool in the field of quality control. Radiographic inspection of materials and objects detects internal voids and flaws which are not otherwise discoverable by visual inspection. Radiography is also an essential tool in the fields of diagnostic and preventive medicine. Moreover, radiographic techniques can be and are employed to advantage in sorting and classifying bulk material.

Heretofore, all known applications of the art of radiography have as an essential element human visual interpretation of the radiograph. The most common form of radiograph is film. An object under test is interposed between a radiation source, typically an X-ray source, and a radiation sensitive film. The film is then developed to visibly show in the form of a shadow image or analog display the intensity of radiation passing through the test object. The image on the film is in effect a cross-sectional view of the interior of the test object.

While film is most commonly used in radiography, it has several very distinct disadvantages. Firstly, development of the film requires very skillful and controlled processing, and is relatively tedious and time consuming. Film has a relatively small dynamic range in terms of the amount of radiation required to go from a black to a white image on development. Consequently, film is not particularly suitable for obtaining indications of the absolute magnitude of radiation passing through a test object. Moreover, e interpretation of a radiograph requires a skilled radiologist, whose judgement, regardless of skill, varies.

Fluoroscopic displays have also been used to render a radiation pattern visible. However, such fluoroscopic displays are not directly viewable as the radiologist would be in the direct path of radiation. Consequently, the display must be viewed through appropriate shielding means which invariably degrade observation capabilities.

In addition to fluoroscopic screens, other devices such as image intensifiers and vidicon tubes are used to render radiation patterns visible. However, human interpretation of the visible radiation patterns or radiographs is still necessary and thus the drawbacks discussed above still prevail.

It has been proposed to use a closed circuit television system to display radiographs on a remote television monitor. Here again, a skilled radiologist must interpret the image displayed on the television screen.

It is thus seen that all prior art radiographic techniques require a radiologist to interpret the radiograph, regardless of how it is generated. As a consequence, such prior art techniques are relatively slow and thus not suitable for use on a production line basis. It will be appreciated that reliability suffers in situations where one must visually interpret a series of displays in rapid succession. In time, observer hypnosis would invariably set in. Moreover, human presence, particularly in the form of a skilled radiologist, renders such prior art techniques expensive.

SUMMARY OF THE INVENTION

By the present invention, there is provided a system for evaluating the radiographic density of a test object without requiring the presence of a skilled radiologist. According to the invention, a conventional television camera is positioned to view a radiographic display developed by radiation passing through a test object from a suitable radiation source, such as an X-ray generator.

In addition to the test object, a reference object of known radiographic density is also irradiated and its radiograph is also viewed by the TV camera. The use of a reference object is preferable since it permits convenient compensation for fluctuations in the intensity of radiation emitted by the source.

The television camera converts the radiographic density of the test and reference objects into corresponding video signals. The camera also generates horizontal and vertical sync pulses identifying the line scan and raster rates of the camera. The horizontal and vertical sync pulses are used by inspection and reference zone control networks to blank out all areas of the camera field of view except for localized reference and inspection zones. These zones correspond to the positions of the respective radiographs in the camera field of view. Thus, during the time the reference object radiograph is being scanned by the camera, a reference zone enabling signal developed by the reference zone control network gates the video signals representing the radiographic density of the reference object through to an integrating circuit. The integrating circuit integrates the video signal amplitude and provides an analog output voltage proportional to the average radiographic density of the reference object.

An inspection zone control network responds to horizontal and vertical sync pulses to electronically blank out all areas of the camera field of view except for a localized inspection zone corresponding to the position of the test object radiograph in the camera field of view. The signal output from the inspection zone control network enables a comparator to compare the analog voltage output from the integrator with the video signal representing the test object radiograph. The output of the comparator, an analog difference signal, may be used to control a meter reading in terms of relative radiographic density of the test object or in terms of the absolute radiographic density of the test object. Alternatively, the comparator output may be applied to a level detector which operates, when the difference signal exceeds a predetermined level, as a go-no-go detector for signaling a handler mechanism to reject the object under test.

A second embodiment of the invention is adapted to handle a plurality of test objects whose radiographs are developed in succession. The test objects are concurrently stationed in the radiation path or are moved serially across the radiation path. Thus, the test objects may be stationary during irradiation or in motion. A mask of novel construction is interposed in the path of radiation and is provided with an inspection aperture aligned with each test object and the radiation source. A synchronization slot is provided in the mask a known distance to the left of the aperture where the camera line scan is from left to right. Radiation passing through the synchronization slot during each line scan develops a synchronization pulse in the video output of the camera. The synchronization pulse triggers delay circuitry which operates to time the interval required for the camera to scan from the synchronization slot to the left-hand edge of the inspection aperture in the mask. A second delay circuit times the width of the inspection aperture during which the radiographic display of the associated test object is being scanned. In addition, the height of the synchronization slot is made equal to the height of the inspection aperture in the mask and thus electronic blanking of the camera field of view surrounding the inspection zone is keyed wholly to the synchronization slot and not to the horizontal and vertical sync pulses of the television camera. Consequently, as long as the mask remains in alignment with the test object, the test object may move through the field of view as well as remain stationary, as desired.

As an additional feature, one or more identification slots are included in the mask intermediate the synchronization slot and the inspection aperture. The radiation passing through these identification slots is translated into video signal pulses which are decoded by the system to determine which of the plural radiographs is to be scanned by the camera. A go-no-go level detector responding to the differences in the radiographic densities of each test object and the reference object signals an automated handler of the test objects to reject a particular one found to be defective.

The invention accordingly comprises the features of construction, combinations of elements, and arrangements of parts which will be exemplified in the construction hereinafter set forth, and the scope of the invention will be indicated in the claims.

For a fuller understanding of the nature of the invention, reference should be had to the following detailed description taken in connection with the accompanying drawings in which.

Similar reference numerals refer to like parts throughout the several views of the drawings.

DETAILED DESCRIPTION

Figure 1:
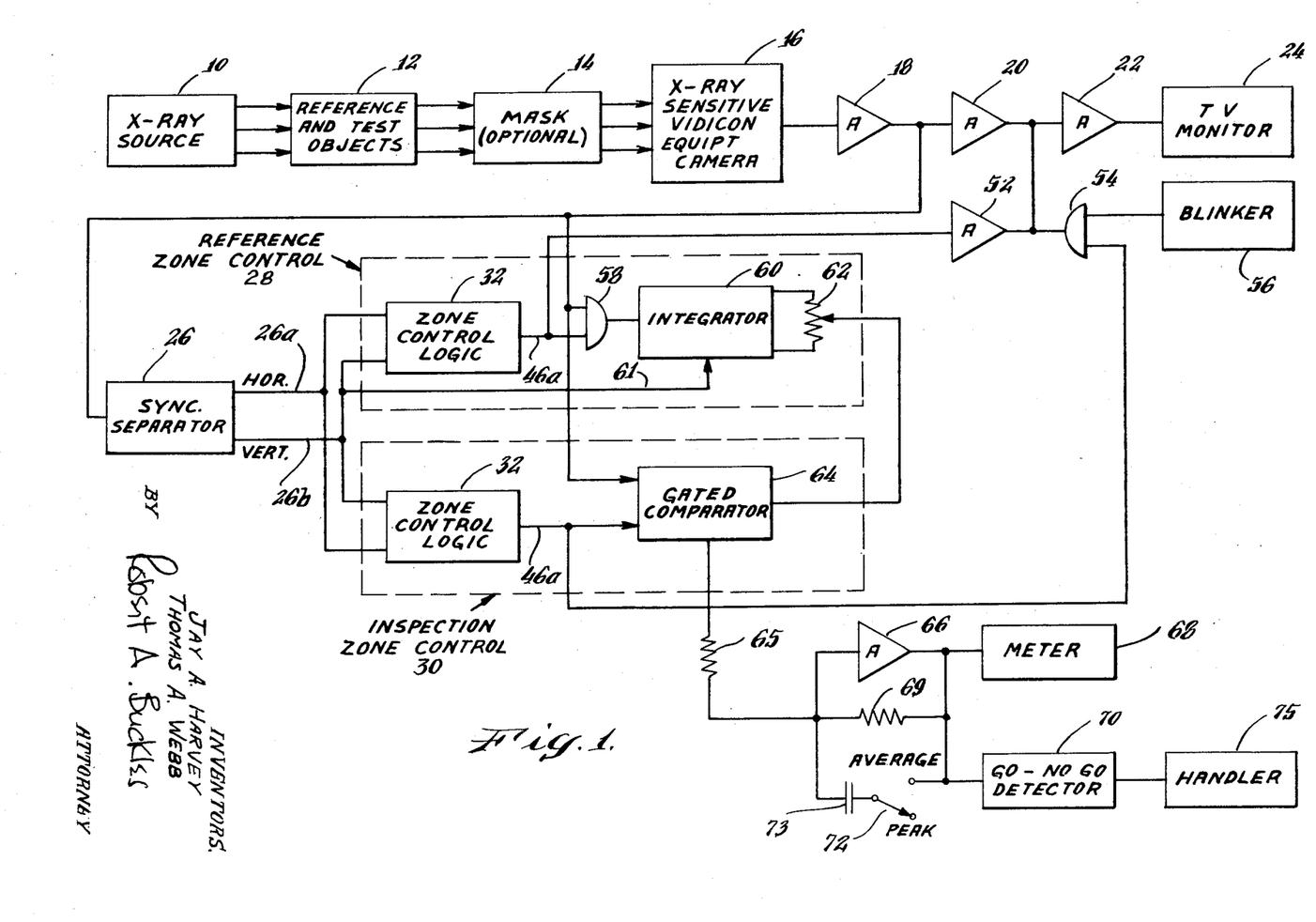
FIG. 1 is an overall diagram of one embodiment of the invention.

The embodiment of the invention disclosed in FIG. 1 is adapted to electronically analyze the radiographic density of a test object in relation to the radiographic density of a test object in relation to the radiographic density of a reference object and provide a meter indication of the absolute or relative value of the radiographic density of the test object. Alternatively, the system indicates on a go-no-go basis whether or not the test object is of acceptable quality. As seen in FIG. 1, an X-ray source 10 concurrently irradiates a reference object and a test object, jointly indicated at 12. While an X-ray source is indicated, it will be appreciated that other types of radiation may be used. The radiation passing through the reference and test objects in parallel also passes through a suitably apertured mask 14 and impinges on the X-ray sensitive face of a vidicon tube.

As generally indicated at 16, the X-ray sensitive vidicon tube replaces the conventional vidicon tube of a TV camera and converts the radiographs to video signal intelligence. The TV camera is part of a closed circuit television network (CCTV) which supplies video signals through a series of conventional buffer amplifiers 18, 20 and 22 to a TV monitor 24 which displays the radiographs of the reference and test object as separate visible images on its screen. As will be seen, the TV monitor 24 merely serves as monitoring check on the overall system operation while analysis of the radiographs is accomplished electronically by the remainder of the system of FIG. 1 to be described.

Rather than employing an X-ray sensitive vidicon equipped TV camera 16 as generally shown in FIG. 1, an image intensifier of conventional design may be used to visibly develop the radiographs which are then viewed by a conventional TV camera in converting the radiographs to video signal intelligence. Moreover, the mask 14 may not be required for some applications of the system of FIG. 1. Generally, masks are commonly used in radiography to shield the radiographic element from unattenuated or direct radiation which does no pass through either the reference or the test objects. This radiation constitutes background and has no intelligence value. Moreover, direct radiation impinging on the radiographic element will invariably cause flooding or fringing effects which splash over into the radiographic density image of the reference and test objects, rendering them difficult of interpretation. Thus, in the majority of situations, masking is preferred. However, in certain applications where the radiographic density of only the central portion of a test object is desired, masking is unnecessary. This is particularly so in the system of FIG. 1 since electronic blanking or masking is provided so that the system responds only to video information corresponding to preselected, localized zones in the camera field of view.

Still referring to FIG. 1 the video signal transmitted by the TV camera 16 has all of the characteristics of a normal TV signal. Thus, the video signal has, in addition to video intelligence, interlaced horizontal sync pulses marking each horizontal line scan and vertical sync pulses marking each raster or frame.

The video signal at the output of buffer amplifier 18 is also fed to a conventional sync separator 26. The sync separator strips off the video intelligence and provides horizontal sync pulses on output line 26a and vertical sync pulses on output line 26b. The horizontal and vertical sync pulses are supplied as separate inputs to a reference zone control network 28 and an inspection zone control network 30, as seen in FIG. 1. Each of the zone control networks includes zone control logic 32 of identical construction. These logic circuits process the horizontal and vertical sync pulses to generate reference and inspection zones for the objects.

Figure 2:
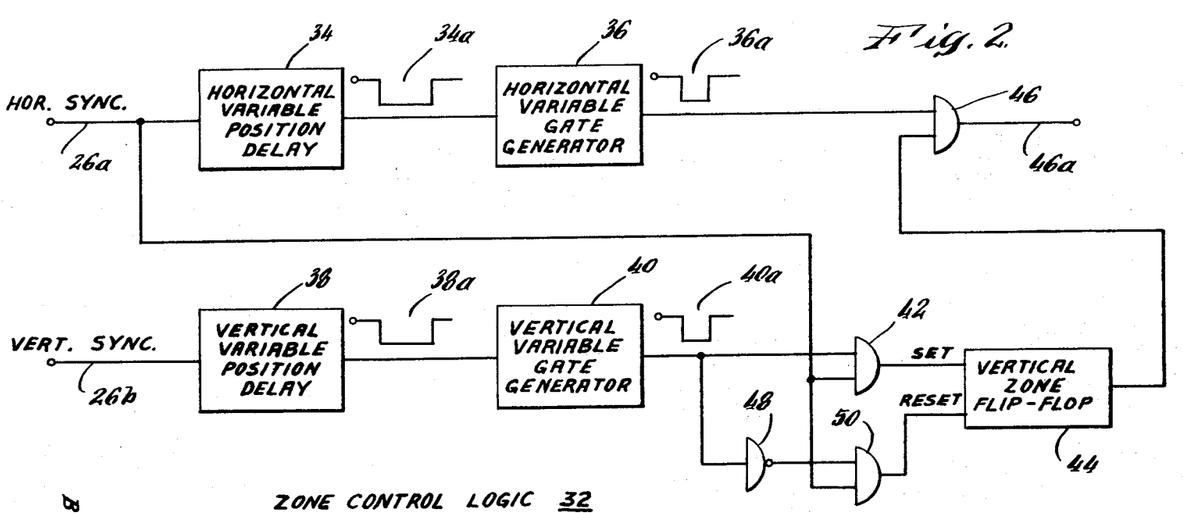
FIG. 2 is a detailed block diagram of the zone control logic circuits in the system of FIG. 1.

The control logic circuits 32 of the reference zone control network 28 and the inspection zone control network 30 are shown in greater detail in FIG. 2. Each zone control logic circuit includes a horizontal variable position delay circuit 34, a horizontal variable gate generator 36, a vertical variable position delay circuit 38 and vertical variable gate generator 40. Horizontal sync pulses on line 26a are used to trigger the horizontal position delay circuit 34 while vertical sync pulses on line 26b trigger the vertical position delay circuit 38. The circuits 34, 36, 38 and 40 may take the form of conventional delay multivibrators, but preferably each is constructed in the manner shown in FIG. 6, which will be subsequently described in detail.

Still referring to FIG. 2, each horizontal sync pulse on output line 26a of the sync separator 26 triggers the horizontal position delay circuit 34 which operates in response to define a finite time delay. This time delay, termed horizontal position delay, is defined in terms of the length of a pulse 34a developed at the output of circuit 34. This pulse 34a is shown in FIG. 2 as a negative pulse solely for the purposes of illustration and may in practice be either positive or negative in polarity. The trailing edge of pulse 34a is effective to trigger the horizontal gate generator 36, which operates to define a second time delay, again in terms of an output pulse 36a of finite duration.

Similarly, vertical sync pulses from sync separator 26 issuing on line 26b are each effective to trigger the vertical position delay circuit 38 into generating a pulse 38a of a finite time duration. The trailing edge of pulse 38a is used to trigger the vertical gate generator 40 which generates an output pulse 40a, again of finite duration.

The output pulse 40a qualifies one input of a coincidence gate 42 which passes the next occurring horizontal sync pulse to the set input of a vertical zone flip flop 44. The flip flop 44 is thus triggered to its set condition and its set output is used to enable a coincidence gate 46 to pass the pulse 36a generated by the horizontal gate generator through to the gate output 46a. The output pulse 40a generated by the vertical gate generator 40 is also inverted in an invertor 48, the output of which enables a coincidence gate 50 during the absence of pulse 40a. When enabled, the coincidence gate 50 passes horizontal sync pulses through to the reset input of flip flop 44, triggering it to its reset condition after it had been set from the output of coincidence gate 42. It is thus seen that the flip flop 44 is triggered to its set condition and remains there during the interval of the pulse 40a. Immediately upon termination of this pulse, the flip-flop is reset.

Returning to FIG. 1, the output lead 46a of coincidence gate 46 (FIG. 2) in the zone control logic 32 of reference zone control network 28 is connected to a buffer amplifier 52. The amplifier 52 is in turn connected to the line carrying the video signal intelligence from the TV camera 16 to the TV monitor 24. The output appearing on line 46a of the reference zone control network 28 is employed to boost the base level of the video signal concurring in time therewith. This serves as an intensification signal to brighten the TV monitor screen for display of the video intelligence associated in time with the reference zone and corresponding to the radiographic density of the reference object, as will be seen.

Similarly, the output lead 46a of the zone control logic 32 in the inspection zone control network 30 is connected to one input of a coincidence gate 54. The output of the coincidence gate 54 is connected to the line carrying the video intelligence to the TV monitor 24, and thus the output on line 46a serves to intensify the display of the video intelligence associated in time with the inspection zone and corresponding to the radiographic density of the test object. It is desirable to periodically condition gate 54 with a blinker 56 which may take the form of a free-running multivibrator. The video intelligence associated with the inspection zone (the test object radiograph) is presented on the TV screen as a flickering image, and thus is readily distinguishable from the displayed reference object radiograph.

Figure 3:
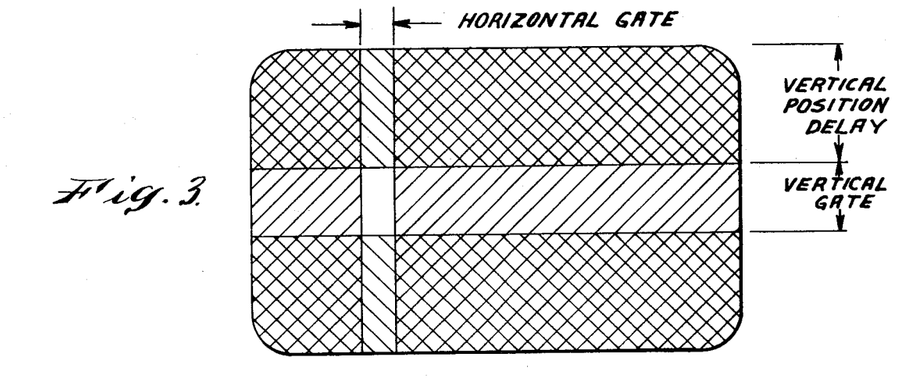
FIG. 3 is a front view of a television display illustrating the electronic blanking carried out by the system of FIG. 1 to develop localized reference and inspection zones.

To better appreciate the operation of the zone control logic circuits 32 in the reference and inspection control networks 28 and 30, reference is had to FIG. 3 which illustrates the television screen of the TV monitor 24. As shown, the horizontal position delay 34 determines by the duration of its output pulse 34a the distance in from the left-hand edge of the screen to the left-hand edge of the inspection or reference zones; the left-hand edge of the screen display being marked by each horizontal sync pulse. The width of the zone is determined by the length of pulse output 36a from the horizontal gate generator 36 (FIG. 2). Similarly, the distance down from the top of the TV display to the top of the zone is defined by the pulse length of pulse 38a issuing from the vertical position delay 38 of FIG. 2. The height of the zone is determined by the duration of the pulse 40a issuing from the vertical gate generator 40 of FIG. 2. By virtue of the coincidence function of the gate 46 of FIG. 2, the television monitor displays only the localized inspection or reference zone as only the video signals associated in time therewith are intensified. This is illustrated in FIG. 3 by different cross-hatching. Since the intensification signals for the inspection and reference zones are separately derived, two brightened rectangles will be concurrently displayed on the monitor screen. The delays provided by circuits 34, 36, 38 and 40 are adjustable so that the positions and sizes of the two zones as displayed on the screen may be varied as desired.

In order to avoid instances of ambiguity in defining the height of the inspection or reference zones as seen in FIG. 3, the invertor 48, coincidence gates 42 and 50, and the flip-flop 44 of FIG. 2 are utilized to insure the top of the zone corresponds to one line scan and the bottom of the zone corresponds to another. This is achieved by gating horizontal sync pulses through gates 42 and 50 to set and reset the flip-flop 44. Flip-flop 44, in turn, enables gate 46.

It will be appreciated that the reference zone and the inspection zone logic circuits 32 are suitably adjusted so that their respective zones occupy different areas on the TV monitor screen. The location of the reference and inspection zones on the monitor screen correspond to the locations of the reference and test object radiographs in the field of view of the television camera 16. Thus, the video signal intelligence pertaining to the radiographic density of the reference object is displayed in the reference zone while the video signal intelligence pertaining to the radiographic density of the test object is displayed in the inspection zone. As will be seen in FIG. 1, the reference object's radiograph must be scanned first and the reference object is thus preferably positioned to orient its radiograph in the upper left corner of the camera field of view, and the reference zone is thus correspondingly positioned on the monitor screen.

While the description thus far has been confined to the situation of one stationary test object and associated inspection zone, it will be appreciated that there may be a plurality of irradiated test objects and a corresponding plurality of inspection zones. In this event, an inspection zone control network 30 is assigned to each test object. However, still only one reference object is required.

The description to this point has been concerned with displaying radiographic density images of the reference and test objects on the TV monitor screen. The remaining portion of the system of FIG. 1 is concerned with electronically analyzing and interpreting the video signal intelligence which developed the radiographs displayed by the monitor. To this end, the reference zone intensification pulse on line 46a which is generated for each line scan of the reference zone is also applied to one input of a coincidence gate 58. Each such intensification pulse enables gate 58 to pass the video signal applied to its other input. The output of gate 58 is applied to a conventional integrator network 60 which integrates the video signal representing the radiographic density of the reference object. Vertical sync pulses, supplied over line 61 to the integrator network 60, are used to discharge it at the beginning of each raster or frame. Thus, at the conclusion of each complete scan of the reference object radiograph during each raster, an analog voltage proportional to the radiographic density of the reference object is developed across a resistor 62 at the output of the integrator network.

The inspection zone intensification pulses on line 46a at the output of the inspection zone control logic 32 are used to gate a conventional gated comparator network 64 such that it accepts video signal intelligence of the test object radiographic density for comparison with a selected portion of the analog voltage across resistor 62 at the output of integrator 60. The output of the comparator 64 is a positive or negative analog signal depending on whether the radiographic density of the test object is greater than or less than the average radiographic density of the reference object and is fed through a resistor 65 and a buffer amplifier 66 to a meter 68.

The meter may be calibrated in terms of the known average radiographic density of the reference object so as to indicate in absolute terms the radiographic density of the test object. Since the radiographic density of the two objects are being processed in terms of video signal intelligence and not in terms of human judgment based on the observation of radiographs, the meter 68 is capable of providing an absolute measurement indication of precision heretofore impossible. It will also be appreciated that the meter 58 may merely indicate the radiographic density of the test object relative to that of the reference object.

Alternatively, or concurrently, the output from the comparator 64 is applied through a resistor 69 to a go-no-go level detector 70. The detector 70 responds to peak deviation between the radiographic densities of the reference and test objects, and provides an indication if the peak deviation exceeds a predetermined level.

As another alternative, a switch 72 is manipulated to connect a capacitor 73 across the resistor 69 to form an integrator circuit. In this event, the detector 70 responds to the integral of or the average deviation of the radiographic density of the test object relative to that of the reference object. If this average deviation exceeds a predetermined minimum, the detector 70 develops an output indication.

In certain applications, the test object may be conveyed on a suitable automated handler which operates to bring it into position for irradiation by the X-ray source 10. To eliminate the necessity for an operator having to observe a visual indication generated by the detector 70 and manually remove a defective test object, the go-no-go detector may be adapted to signal the handler, generally indicated at 75 in FIG. 1, which automatically rejects the defective test object.

Figures 5, 6:
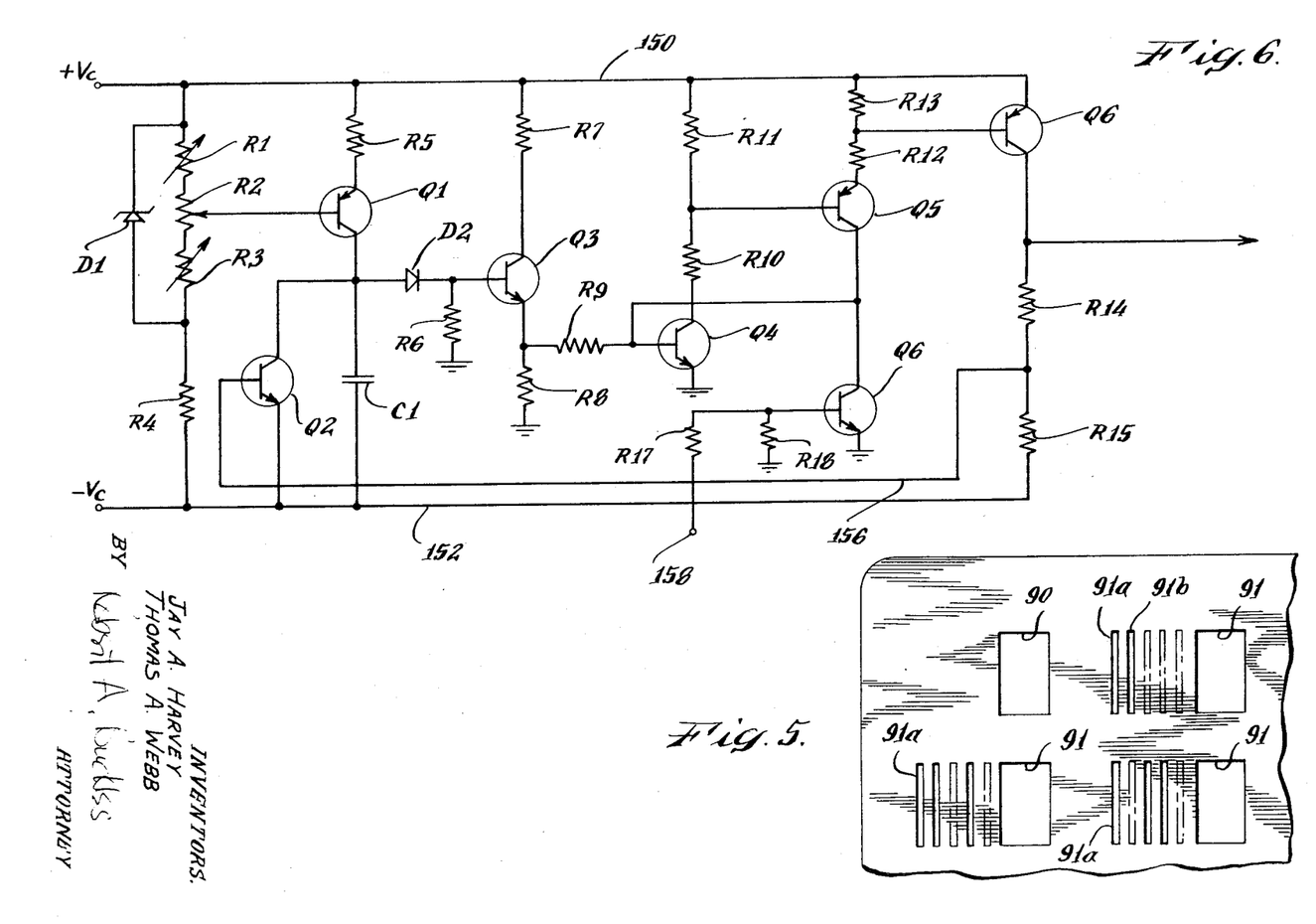
FIG. 5 is a side elevational fragmentary view of a radiopaque mask used in conjunction with the system of FIG. 4.
FIG. 6 is a detailed circuit diagram of the various delay circuits shown in FIG. 2.

The horizontal and vertical variable position delay circuits and the horizontal and vertical variable gate generators shown in FIG. 2 are preferably each constructed in the manner shown in FIG. 6. Accordingly, a positive buss 150 is connected to a positive supply voltage $+V_c$ while a negative buss 152 is connected to a negative supply voltage $-V_c$. Consequently, the circuit shown in FIG. 6 is split across ground potential. A voltage divider consisting of resistors R1, R2, R3 and R4 is connected across busses 150 and 152. A zener diode D1 is connected across the string of resistors R1, R2 and R3 so as to maintain a constant voltage drop thereacross. A selected constant voltage is tapped from resistor R2 and is supplied to the base of a transistor Q1. The emitter of this transistor is connected to buss 150 while its collector is connected to buss 152 through capacitor C1. Capacitor C1 is shunted by the collector-emitter circuit of a transistor Q2. Resistors R1 and R3 are variable and the tap 154 is adjustable so as to establish the desired conductance level of transistor Q1 and thus provide a selected constant charging current for capacitor C1. The upper end of the capacitor C1 is connected through a diode D2 to the base of an emitter-follower transistor Q3. The base of this transistor is returned to ground through a resistor R6. The collector of transistor Q3 is connected to buss 150 through resistor R7 while its emitter is grounded through resistor R8.

The upper end of resistor R8 is connected through a resistor R9 to the base of a transistor Q4, which in combination with a transistor Q5 comprise a complimentary flip-flop. Thus, the collector of transistor Q4 is connected to buss 150 through resistors R10 and R11, and the junction therebetween is directly connected to the base of transistor Q5. The emitter of transistor Q4 is tied to ground while its base is directly connected to the collector of transistor Q5. The collector of transistor Q5 is also selectively connected through the collector-emitter circuit of a transistor Q6 to ground while its emitter is connected to buss 150 through resistors R12 and R13. The junction between resistors R12 and R13 is tied to the base of a transistor Q7 whose emitter is directly connected to buss 150 and collector is connected to buss 152 through resistors R14 and R15.

The pulse output of the circuit of FIG. 6 is developed at the junction 155 between resistor R14 and the collector of transistor Q6. The junction between resistors R14 and R15 is fed back over lead 156 to the base of transistor Q2. The input to the circuit of FIG. 6 is either horizontal or vertical sync pulses supplied to terminal 158 which is, in turn, connected through a resistor R17 to the base of transistor Q6. The base of this transistor is referenced to ground through a resistor R18.

The circuit of FIG. 6 operates as follows. Transistors Q4 and Q5 of the complimentary flip-flop are normally conducting which will be termed the latched state of the flip-flop. Transistor Q6 is nonconducting. Transistor Q5 draws current through the emitter-base junction of transistor Q4 thus maintaining this transistor conducting. The conductance of transistor Q4 then maintains transistor Q5 forward biased and in conductance. As a result, transistor Q7 is normally conducting and the voltage level at the junction of resistors R14 and R15 is such as to bias transistor Q2 into conductance. Consequently, capacitor C1 is shorted through the collector-emitter circuit of transistor Q2 and no charge is developed thereacross. The voltage at output junction 155 is approximately $+V_c$ volts.

On the occurrence of a sync pulse at input terminal 158, transistor Q6 is triggered into conductance. The collector of transistor Q5 is shorted to ground and thus no longer draws current through the emitter-base junction of transistor Q4. This transistor is rendered nonconductive with the result that transistor Q5 is cut off. Transistor Q7 becomes nonconductive and transistor Q2 is cut off. Capacitor C1 is no longer shorted and it begins charging from the constant current supplied through the emitter-collector circuit of transistor Q1. It will be noted that the moment the transistor Q7 becomes nonconductive, the output junction 155 goes negative and thus constitutes the leading edge of the output pulse.

As capacitor C1 charges and the voltage developed across it rises through ground potential, transistor Q3 is rendered conductive. The conductance of this emitter-follower transistor causes transistor Q4 to go into conduction which results in the conduction of transistor Q5. It will be noted that in the meantime the sync pulse has terminated and transistor Q6 is no longer conductive. Consequently, the complimentary flip-flop can revert to its latched state with both transistors Q4 and Q5 conducting. Transistor Q6 goes into conductance causing the output junction 155 to go positive, thereby defining the trailing edge of the output pulse which is used to trigger subsequent circuitry. The voltage at which the junction between resistors R14 and R15 rises to trigger transistor Q2 into conductance, thereby discharging capacitor C1 and the circuit of FIG. 6 is conditioned for receipt of the next sync pulse.

One of the principle features of the circuit of FIG. 6 resides in connecting the circuit to plus and minus power supply voltages and thus splitting the circuit across ground. Thus, the effective power supply voltage is relatively large as is the voltage ramp function developed across capacitor C1, and this serves to minimize the effects of variations with temperature of the junction potentials of the various transistors and diodes. Moreover, the adjustable elements of the circuit, that is, resistors R1, R2 and R3 may be located remotely from the remainder of the circuit, such as at the front panel of the instrument, without significantly affecting the constant current operation of transistor Q1.

In many automated quality control situations, a plurality of stationary test objects are irradiated concurrently. Alternatively, test objects may be translated through the path of radiation emitted from the source in succession. Even in this situation, more than one test object will likely be irradiated at a time. In either case, the system must not only look for flaws in each of the test objects, but also must designate which one of the series of test objects has a detected flaw. Otherwise, if any one of the test objects has a detected flaw the whole series would have to be rejected. Moreover, radiation analysis of objects on the move presents special synchronization problems beyond the capabilities of the system of FIG. 1. The system of FIG. 4 is adapted to handle all these situations.

Figure 4:
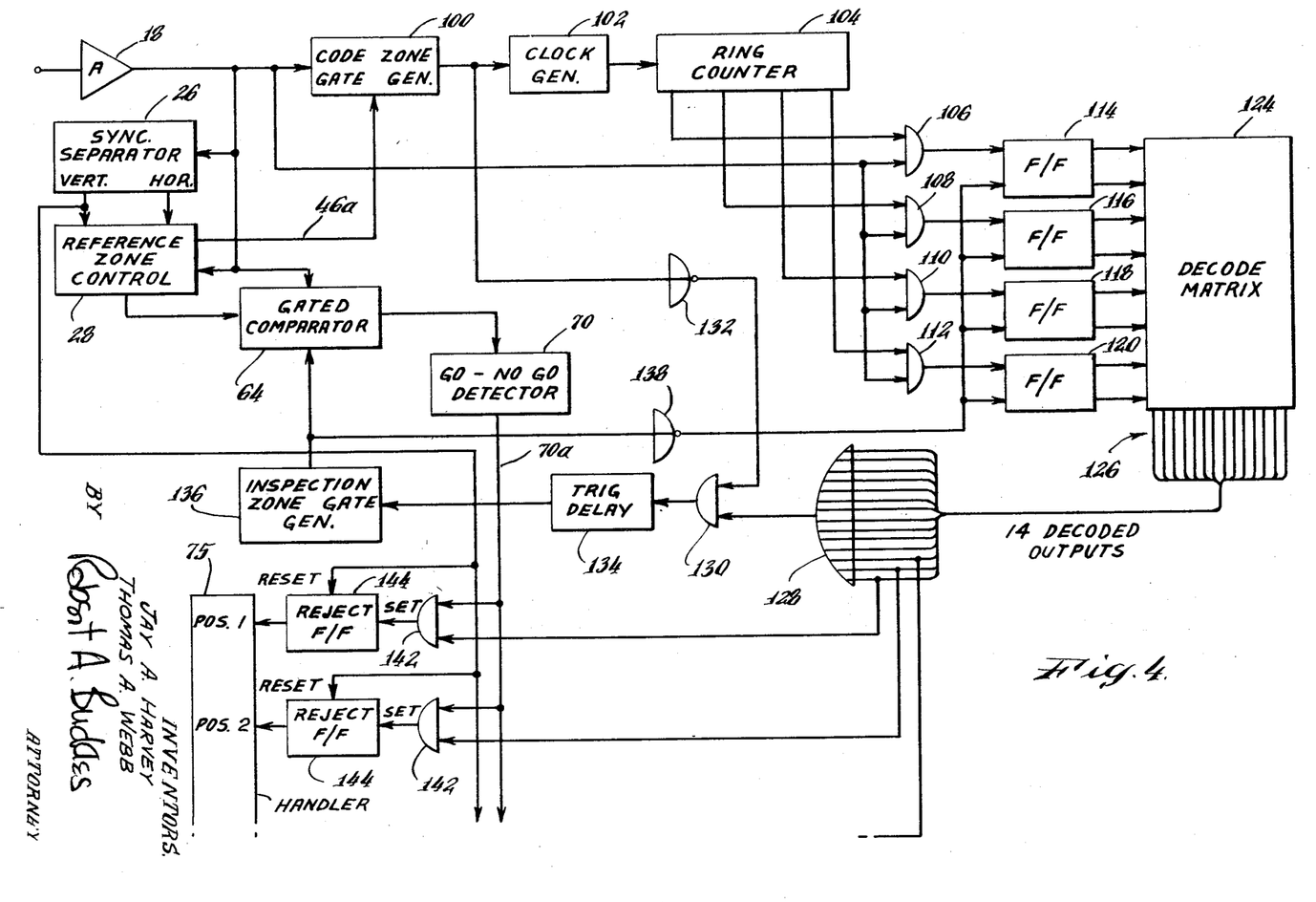
FIG. 4 is a detailed block diagram of a second embodiment of the invention.

To better appreciate the operation of the system of FIG. 4, reference is first made to FIG. 5 which shows a portion of a radiopaque mask 14'. This mask is provided with a reference object aperture 90 located near the upper left-hand corner thereof. The reference object is aligned with aperture 90 and the radiation source. The mask 14' is also formed having a plurality of test object or inspection apertures 91. Each test object is aligned with a different one of the apertures 91 and the radiation source. The system of FIG. 4 has a capacity to handle 14 test objects in conjunction with a single reference object as will be seen. However, this system of FIG. 4 and the mask FIG. 5 may be modified so as to handle any number of test objects.

Still referring to FIG. 5, to the left of each inspection aperture 91 is a series of narrow slots through which radiation passes. The system of FIG. 4 is adapted to process the video signals arising from the presence of these slots to develop a numerical code uniquely identifying each inspection aperture. The left most slot 91a in each series is positioned a precise distance to the left of the left-hand edge of each aperture 91. This slot 91a serves to generate a synchronization pulse to forewarn the system that an aperture 91 is located a known distance to the right as the TV camera scans left to right for each line scan. Between slot 91a and its associated inspection aperture are four uniformly spaced slot positions 91b which may or may not be slotted depending upon the numerical designation assigned to that particular inspection aperture. In practice, at least one slot position is slotted in every case to reduce the chance of spurious system response to noise. Thus, in FIG. 5 the inspection aperture 91 to the right of the reference aperture 90 is provided with a slot 91b in the first slot position. In the binary code format this would represent a binary 1, denoting the first inspection aperture. In the case of the aperture 91 immediately below the reference aperture 90, the first and the third slot position are slotted, thus denoting a binary 5 which the system interprets as the fifth inspection aperture. The remaining apertures 91 in mask 14' are similarly coded.

It will be appreciated that the mask 14' shown in FIG. 5 is adapted to handle the situation where a plurality of test objects are concurrently irradiated and the resulting radiographs are scanned successively by the TV camera. It will be appreciated, in the case where the test objects are translated serially through the path of radiation as where the objects are carried on a turntable or conveyor, that the mask 14' of FIG. 5 would take a different physical form although the concept remains the same. Rather than a single mask having a plurality of inspection apertures 91, there would be provided a plurality of masks, one associated with each test object and moving in synchronism therewith. Each mask would have an inspection aperture 91 and, to the left, a synchronization slot 91a and coded slots 91b. The reference aperture 90 would be accommodated in a separate mask. The reference object and its mask may remain stationary in the radiation path or each test object and associated mask may have its own reference object and associated mask moving in synchronism therewith.

Before turning to the system of FIG. 4, it should be pointed out that the top and bottom of slots 91a is horizontally aligned with the top and bottom of its associated inspection aperture. As will be seen, this permits the synchronization pulse generated by slot 91a in each line scan to determine the height and vertical position of the associated inspection zone, thus eliminating the need for a vertical position delay circuit 38 and a vertical gate generator 40 (FIG. 2) in the system of FIG. 4.

Turning now to FIG. 4, the buffer amplifier 18 corresponds to the buffer amplifier 18 in FIG. 1 which receives the video signal intelligence transmitted by the camera 16. As is in the system of FIG. 1, the video signal at the output of the buffer amplifier 18 is supplied to the sync separator 26 and to the reference zone control network 28. The sync separator 26 strips off the video intelligence and separates out the horizontal and vertical sync pulses which are supplied as separate inputs to the reference zone control network 28. The reference zone control network generates the reference zone which coincides in time with each line scan of the reference aperture 90 in the mask 14' in FIG. 5. An analog voltage proportional to the average radiographic density of the reference object is supplied to one input of the gated comparator 64.

Still referring to FIG. 4, the video signal at the output of the buffer amplifier 18 is also fed to a code zone gate generator 100, which triggers on receipt of the video signal pulse corresponding to the radiation passing through the synchronization slot 91a in the mask 14' (FIG. 5). The code zone gate generator 100 generates an output pulse whose duration is equal to the time required for the camera to scan the four coded slot positions 91b during each line scan. The leading edge of this output pulse triggers a clock pulse generator 102 which generates four uniformly spaced clock pulses during the duration of this pulse. Each clock pulse coincides in time with the video pulses generated by the successive coded slot positions 91b in the mask 14', if slotted, and together are effective to cycle a ring counter 104 through a four count.

The parallel outputs from ring counter 104 are applied as separate inputs to coincident gates 106, 108, 110 and 112. The video signal from the output of the buffer amplifier 18 is supplied in parallel to each of the second inputs of gates 106, 108, 110 and 112. The outputs of these gates are respectively supplied to the set inputs of flip-flops 114, 116, 118 and 120 which together form a register generally indicated at 122.

It is thus seen that the ring counter 104 operates to shift the binary coded designation of a particular aperture 91 into the register 122. For example, in the case aperture 91 immediately below the reference aperture 90 in FIG. 5, the first and the third slot positions are slotted to generate video pulses at the output of the buffer amplifier 118. The ring counter 104 shifts these video pulses into flip-flops 114 and 118, and thus the register 122 stores the number five.

The outputs of the register 122 are fed to a decode matrix 124 operating as a binary to decimal code convertor. The matrix 124 has 14 output lines commonly indicated at 126, one of each of the 14 inspection apertures in the illustrated embodiment. Only 14 inspection apertures 91 are used in the illustrated embodiment despite the fact that the 4-bit binary code employed has the capacity of designating 15 separate apertures. It is preferred, however, to disregard the binary zero designation (absence of slots in all four slot positions) in the matrix 124 to thus avoid response to spurious noise pulses, as well as horizontal and vertical sync pulses.

The 14 outputs 126 from the decode matrix 124 are supplied as separate inputs to an OR gate 128. The output of OR gate 128 is supplied as one input to an AND gate 130. The other input to this AND gate is derived from the output of the code zone gate generator 100 through the invertor 132. Thus, AND gate 130 is enabled so as to trigger a delay circuit 134 on the trailing edge of the output pulse from code zone gate generator 100 if an inspection zone position has been decoded (one of the 14 decoded outputs 126 is active). The trigger delay circuit 134 functions in the manner of the horizontal position delay circuit 34 of FIG. 2 in that it locates the left-hand edge of the inspection aperture 91 relative to the occurrence of the synchronization pulse produced by synchronization slot 91a (FIG. 5). At the end of the delay defined by the trigger delay circuit 134 in terms of the duration of its output pulse, the inspection zone gate generator 136 is triggered to electronically define the width of the inspection zone and inspection aperture exactly in the manner of the horizontal gate generator 36 of (FIG. 2). The output pulse generated by the inspection zone gate generator 136 in FIG. 4 is used as a gating pulse for the comparator 64 and is also supplied through an invertor 138 to the reset inputs of flip-flops 114, 116, 118 and 120 in register 122. Thus the flip-flops of register 122 are reset on the trailing edge of the output pulse from the inspection zone generator 136.

The gated comparator 64 of FIG. 4 operates in the manner previously described in connection with FIG. 1 to compare the analog signal representing the average radiographic density of the reference object to the video signal representing the radiographic density of the particular radiograph being scanned. As before, this comparison is carried out on a line scan by line scan basis. Each line scan comparison thus constitutes a separate comparison operation. The output of the gated comparator 64 is fed to a go-no-go detector 70 which operates as a level detector to generate an output signal on line 70a in the event the difference output of the comparator 64 exceeds a predetermined level.

The output line 70a from the detector 70 is connected in parallel to one input of a plurality of AND gates 142, one being assigned to each of the inspection zones or apertures 91 (FIG. 5). Thus, in the illustrated embodiment, there are 14 AND gates 142 although, for the sake of simplicity, only two are shown in FIG. 4. The other input to each AND gate 142 is supplied from the particular output line 126 associated with the same inspection zone. Thus, if the upper AND gate 142 in FIG. 4 is associated with the first inspection zone its other input is derived from the output line 126 associated with the first inspection zone or aperture. The output of each AND gate 142 is supplied to the set input of a different reject flip-flop 144. Thus, if the test object in the first inspection aperture 91 is defective, its associated AND gate 142 is fully enabled to set the reject flip-flop 144 connected thereto. The set output of the reject flip-flop 144 is then used to signal the handler 75 to automatically reject the appropriate test object.

As shown, all reject flip-flops 144 are reset by each vertical sync pulse occurring at the beginning of each raster. The handler 75 is provided with means to count the times a particular reject flip-flop is set and reset, and the object is rejected only if the count exceeds a preselected number. Alternatively, the set outputs of the reject flip-flops are integrated by solenoids, for example, which upon actuation effect rejection of the appropriate object. This is done to prevent rejection of an object in response to a spurious reject indication resulting from noise, etc.; and thus enhances the reliability of the system. In addition, the reference zone intensification gate signal derived by the reference zone control network 28 on line 46a (FIGS. 1 and 2) is fed to the code zone gate generator 100 as an inhibiting signal, thereby preventing response to video signal pulses associated with the reference object. It will be appreciated that the system of FIG. 4 can be implemented with a TV monitor as in the system of FIG. 1 in order that the operation of the system may be visually monitored for system malfunctions.

It is seen that since the height of the synchronization slot 91a (FIG. 5) is equal to the height of the inspection zone aperture in the mask 14', the need for a vertical position delay circuit and a vertical gate generator is obviated. The video pulse resulting from the presence of the synchronization slot 91a is thus effective by way of trigger delay 134 and inspection zone gate generator 136 to determine the width, height, and location of the inspection zone.

It will also be observed that the system of FIG. 4 is used to inspect test objects on the move. That is, this system could handle test objects which were being continuously moved across the path of radiation. All that is required is that the mask move in synchronism with the test object. The synchronization slot 91a either with or without the coded slots 91b serves to tell the system when to look at the video intelligence representing the radiographic density of the test object, regardless of where it is in the camera field of view.

CONCLUSION

It is seen from the foregoing description that there are provided systems according to the invention which operate to electronically analyze the radiographic density of one or more test objects without requiring the presence of a radiologist. The system can be implemented such that a relatively unskilled operator merely reads a meter indicating the radiographic density of the test object. Alternatively, the system can be implemented to be operated in conjunction with a test object handler to automatically effect rejection of defective test objects. It will be appreciated that the go-no-go detector 70 (FIGS. 1 and 4) may be adjusted to establish any desired rejection criteria. Thus, test objects having only minor flaws may be approved, while those having major flaws are rejected; all of this being achieved automatically.

In the system of FIG. 4, it may become desirable to provide additional circuitry for blanking out the video signal associated with the fringes of the camera field of view. This could be readily achieved using delay circuits keyed by the horizontal and vertical sync pulses. These delay circuits would then control a gate such as to pass only the video signal associated with the central portion of the camera field of view. This may be found desirable in order to prevent the system from responding to horizontal and vertical sync pulses as though they were synchronization pulses arising from synchronization slot 91a (FIG. 5). Moreover, parts of the handler 70 conveying the test objects and their associated masks 14' through the radiation path may project into the camera field of view, giving rise to spurious video noise pulses.

As has been noted, the zone control logic 32 (FIGS. 1 and 2) is fully adjustable, and thus an operator may readily vary the size and position of both the reference and inspection zones. Consequently, an operator may shift the inspection zone from position to position to inspect various portions of a single test object. Comparison would be made against the reference zone which would contain a separate reference object or a portion of the test object which is of known radiographic density. This zone positioning may be done automatically.

Moreover, the teachings of the invention may be adapted to provide a zone by zone comparison of an object of unknown radiographic density to a like object of known radiographic density. In this manner, a series of objects could be compared against a like standard object to determine if the objects conform to standard quality. The positions of the inspection and references zones, the former associated with the unknown object and the latter with the standard object, are shifted in unison either manually or automatically. It will be appreciated that in this application the system requires no adjustment according to the particular objects being tested since the objects are tested against a like standard object.

It will also be understood that rather than having the test objects move in relation to the system, the system may move in relation to the test object. This situation arises when the test object is of a large size. Accordingly, the radiation sensitive television camera 16 (FIG. 1) would scan over the test object and, upon detection of a flaw, the system would mark the area of the object containing the flaw.

Since the integrator 60 in the system of FIG. 1 is discharged at the beginning of each raster scan, it is necessary that the reference object radiograph be scanned first. However this need not be the case. If the integrator 60 is not so discharged the test object radiograph may be scanned last in each roster, with the comparison of the test and reference object radiographic densities being performed during the next roster interval, for example.

It is thus seen that the objects of the invention made apparent from the preceding description are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all of the statements of the scope of the invention, which as a matter of language, might be said to fall therebetween.

Having described our invention, what we claim as new and desire to secure by Letters Patent is:

1. A system for evaluating the radiographic density of a test object in comparison with the radiographic density of a standard reference object when both the test object and the reference object are irradiated by a common radiation source, said system comprising, in combination:
    A. a television camera positioned to view the radiographs resulting from irradiation of both the test and reference objects, said television camera developing
        1. video signals proportional to the radiographic densities of both the test object and the reference object, and
        2. horizontal and vertical scan sync pulses;
    B. an inspection zone control network responsive to said vertical and horizontal sync pulses and adjustable to blank out the field of said television camera in all areas except a preselected inspection zone area, and to generate an inspection zone gate signal:
        1. corresponding in time to the location of the test object radiograph in the camera field of view and
        2. enabling detection and generation of video signals only in the area of said preselected inspection zone;
    C. a reference zone control network including
        1. an adjustable reference zone generating circuit responsive to said vertical and horizontal sync pulses for generating a reference zone gate signal adapted to define a localized reference zone,
            a. said reference zone gate signal corresponding in time to the location of the reference object radiograph in the field of view of said camera, and
        2. a reference zone gate responsive to said reference zone gate signal for passing said video signals concurring therewith in time; and
    D. evaluating means comprising a comparator connected to compare the video signals concurring in time with said inspection zone gate signal to the video signals passed by said reference zone gate and provide a signal output indicative of the difference between the radiographic densities of the test object and the reference object.

2. The system defined in claim 1 which further includes:
    A. a television monitor controlled by said inspection and reference zone gate signals and connected to receive the video signals developed by said camera for visually displaying the radiographs of the reference and test objects.

3. The system defined in claim 1 wherein the radiograph of the reference object is scanned first by said camera during each raster, and said reference zone control network further includes
1. an integrator connected to the output of said reference zone gate for integrating the video signals corresponding to the radiographic density of the reference object,
   a. said integrator providing an output signal level proportional to the average radiographic density of the reference object to said comparator.
4. The system defined in claim 1 which further includes
   A. a meter connected to the output of the comparator for indicating the radiographic density of the test object.
5. The system defined in claim 1 which further includes
   A. a level detector connected to the output of said comparator and providing an output when the radiographic density of the test object differs from the radiographic density of the reference object by a preselected amount.
6. The system defined in claim 1 wherein said reference and inspection zones are in the form of rectangles, said reference and inspection zone control networks each including zone control circuitry having:
   1. a horizontal variable position delay circuit triggered by each said horizontal sync pulse to generate a first output pulse having a duration equal to the time required for the trace of said camera to scan from an edge of a raster to one side of said zone,
   2. a horizontal variable gate generator triggered on the trailing edge of said first pulse to generate a second output pulse having a duration equal to the time required for the trace to scan the width of said zone,
   3. a vertical variable position delay circuit response to each said vertical sync pulse for generating a third output pulse having a duration equal to the time required for the trace to reach the line scan corresponding to the top of said zone,
   4. a vertical variable gate generator triggered on the trailing edge of said third pulse to generate a fourth output pulse having a duration equal to the time required for the trace to reach the line scan corresponding to the bottom of said zone,
   5. a vertical zone flip-flop,
   6. gating means controlled by said fourth output pulse to pass horizontal sync pulses for controlling the state of said flip-flop, and
   7. a gate responsive to the output from said flip-flop and said second output pulse to derive said inspection and reference zone gate signals.
7. The system defined in claim 6 wherein at least one of said horizontal and vertical position delay circuits and said horizontal and vertical gate generators consists of a time delay circuit having
   1. a timing capacitor,
   2. a first transistor adjustably biased to pass a preselected constant charging current to said capacitor,
   3. a second transistor connected to shunt said capacitor when conductive, and
   4. a bistable circuit having first and second stable conditions, said bistable circuit being
      a. connected to render said second transistor conductive when in said first condition,
      b. connected to be triggered to said second condition in response to a sync pulse whereupon said second transistor is cut off to permit charging of said capacitor, and
      c. connected to said capacitor and reverting to said first condition when said capacitor has charged to a prescribed voltage level,
      d. said bistable circuit generating an output pulse while in said second condition, the duration of said output pulse being determined by the charging rate of said capacitor.
8. A system for evaluating the radiographic density of an object irradiated from a radiation source, said system comprising, in combination:
   A. a radiopaque mask physically associated with the object and interposed therewith in the path of radiation, said mask having
      1. a synchronization slot formed therein for passing radiation;
   B. means developing a radiograph of the radiation passed by the object,
      1. said radiograph having associated therewith a synchronization mark developed by the radiation passed by said synchronization slot;
   C. means scanning first said synchronization mark and then said radiograph for respective conversion thereof into a synchronization electrical pulse and electrical signals corresponding to the radiographic density of the object;
   D. electronic signal processing circuitry synchronized by said synchronization pulse for processing said radiographic density signals and providing a signal output indicative of the object's radiographic density.
9. The system defined in claim 8 wherein the object is continuously translated across the path of radiation emitted from the source, and said mask is moved in unison therewith.
10. The system defined in claim 8 wherein
    1. said mask is further provided with an inspection aperture adjacent said synchronization slot,
       a. said aperture passing the radiation for developing the radiograph of the object.
11. The system defined in claim 8 wherein a reference object is also irradiated from the radiation source, said developing means develops a radiograph of both the reference and test objects which are converted into corresponding electrical signals by said scanning means, and said signal processing circuitry compares the signals corresponding to the radiographic density of the test objects with the signals corresponding to a radiographic density of the reference object pursuant to providing said signal output.
12. The system defined in claim 8 wherein said scanning means is a television camera.
13. The system defined in claim 8 wherein there is a plurality of objects, and there is provided one said mask physically associated with each object.
14. The system defined in claim 13 wherein each said mask is formed having a plurality of coded slot positions adjacent said synchronization slot, said slot positions being selectively slotted so as to develop coded identification marks which are converted into corresponding electrical pulses by said scanning means, and said electronic signal processing circuitry includes means responsive to said identification pulses for relating each said signal output to the particular object associated therewith.
15. The system defined in claim 14, which further includes
    A. a handler for the objects, said handler
       1. responding to said signal outputs for rejecting a particular one of the objects detected as being defective.
16. A system for evaluating the radiographic densities of a plurality of test objects in relation to the radiographic density of a reference object wherein the test and reference object are irradiated from a radiation source, said system compares in combination:
    A. a radiopaque mask physically associated with each test object and the reference object and interposed therewith in the path of radiation, each said mask associated with a test object and having;
       1. a synchronization slot formed wherein for passing radiation
    B. means developing separate radiographs of the radiation passed by the reference and test objects with each test object radiograph having an associated synchronization mark developed by the radiation passed by said synchronization slot;
    C. a television camera for converting said radiographs into video signals corresponding to the radiographic densities of the reference and test objects and said synchronization marks into video synchronization pulses; and D. electronic signal processing circuitry synchronized by said video synchronization pulses for successively processing the video signals of the test objects' radiographic densities and providing signal outputs indicative of the radiographic densities of each test object.

17. The system defined in claim 16 where the test objects are continually translated through the radiation path, said mask associated with each test object moving in synchronism therewith.

18. The system defined in claim 16 wherein each said mask is provided with a inspection aperture positioned a finite distance from said synchronization slot, said inspection aperture being aligned with an associated one of the test objects and the radiation source and defining the edges of the radiograph thereof, said synchronization mask being scanned before said test object radiograph during each line scan of said camera.

19. The system defined in claim 18 wherein the height of said synchronization slot is equal to the height of its associated inspection aperture and is horizontally aligned therewith.

20. The system defined in claim 19 wherein said mask associated with the reference object is provided with a reference aperture aligned with the reference object and the radiation source, and defining the edges of the reference object's radiograph.

21. The system defined in claim 20 wherein each said mask associated with a test object is provided with a series of uniformly spaced slot positions interposed between said synchronization slot and said inspection aperture, said slot positions being selectively slotted so as to develop corresponding coded marks which are converted into coded pulses by said camera, said signal processing circuitry operating to process said coded pulses to relate said signal outputs to the associated test objects.

22. The system defined in claim 21 wherein said signal processing circuitry includes
  1. a reference zone control network operating in response to the reference object radiographic density video signals to develop a signal level proportional thereto,
  2. a comparator operating to successively compare said signal level with the radiographic density video signals of each test object, said comparator providing said signal output indicative of the difference therebetween.

23. The system defined in claim 22 wherein said signal processing circuitry further includes
  1. decoding means decoding said coded pulses to relate each said comparator signal output to a particular output.

24. The system defined in claim 23 wherein said signal processing circuitry further includes:
  1. a code zone gate generator triggered by each said synchronization pulse to generate a gate pulse defining the time interval during which each series of coded pulses may appear,
  2. said decoding means conditioned by said gate pulse for decoding said coded pulses, said decoding means having a plurality of output leads,
    a. one of said output leads being associated with a different one of the test objects and having a signal thereon when the radiograph of the associated test object is to be scanned by said camera,
  3. a gate conditioned on the termination of said gate pulse to provide an output when any one of said output leads has a signal thereon,
  4. a delay circuit triggered by said gate output to locate the leading edge of said inspection aperture relative to said synchronization slot,
  5. an inspection zone gate generator triggered by said delay circuit and defining the width of said inspection aperture, and
  6. said comparator being enabled by the output of said inspection zone generator to compare the video signals representing the radiographic density of each test object with said signal level from said reference zone control network.

25. A system defined in claim 24 wherein said comparator performs separate comparative operations for each line scan of said camera.

26. The system defined in claim 25 wherein said signal processing further includes:
  1. a series of reject gates, each said reject gate having,
    a. the signal output from said comparator connected as a first input, and
    b. a different one of the output leads from said decoding means connected as a second input, and
  2. a reject flip-flop connected to the output of each reject gate, said flip-flops
    a. selectively triggered to a first state from said reject gates when said comparator signal output indicates a defective test object, and
    b. trigger to a second state at the beginning of each raster scan of said camera;
    c. said flip-flop having outputs connected to a handler for the test objects.

UNITED STATES PATENT OFFICE
CERTIFICATE OF CORRECTION

Patent No. 3,580,997                     Dated May 25, 1971

Inventor(s) Thomas Alan Webb, Jay A. Harvey

It is certified that error appears in the above-identified patent and that said Letters Patent are hereby corrected as shown below:

Col. 1, line 21, after "is" and before "in" insert a comma --,--; after "effect" and before "a" insert a comma --,--; line 31, delete "e" and insert therefor --tne--. Col. 3, line 5, after "overall" insert --block--; lines 26, 27, delete "of a test object in relation to the radiographic density"; line 61, change "no" to --not--. Col. 9, line 72, after "one" delete "of" and insert therefor --for--. Col. 11, line 70, change "references" to --reference--. Col. 12, line 14, change "roster" to --raster--

Signed and sealed this 26th day of October 1971.

(SEAL)
Attest:

EDWARD M. FLETCHER, JR.            ROBERT GOTTSCHALK
Attesting Officer                  Acting Commissioner of Patents